Figure 10:
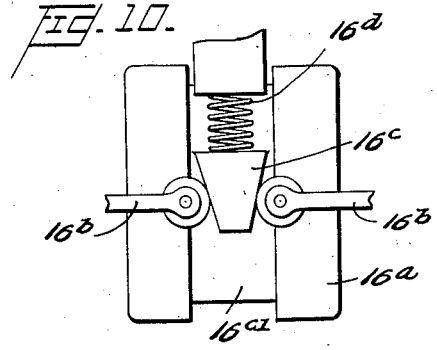

March 25, 1930.  H. W. NIEMAN  1,751,646
MECHANICAL MOVEMENT
Filed Jan. 7, 1926  9 Sheets-Sheet 1
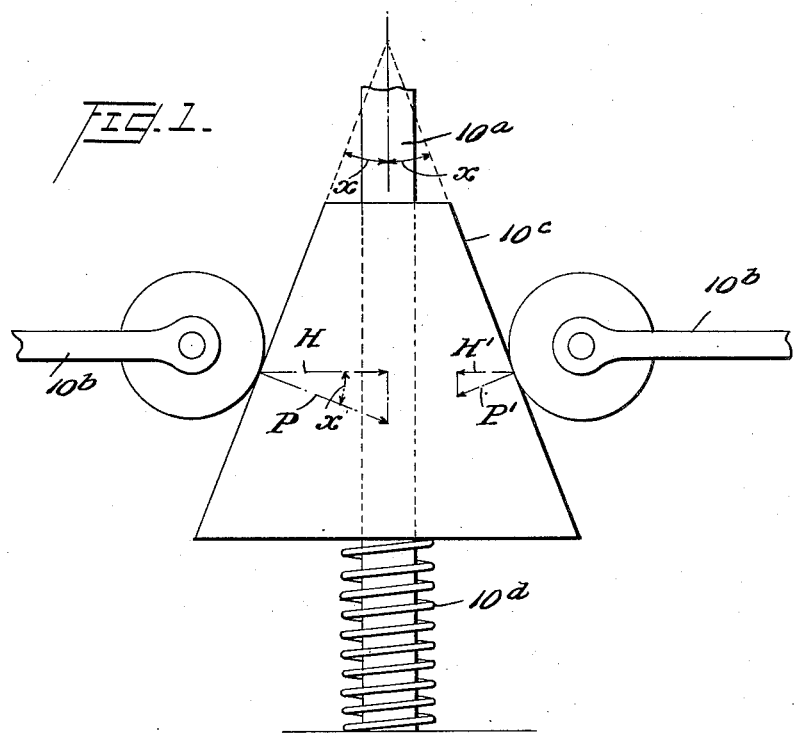
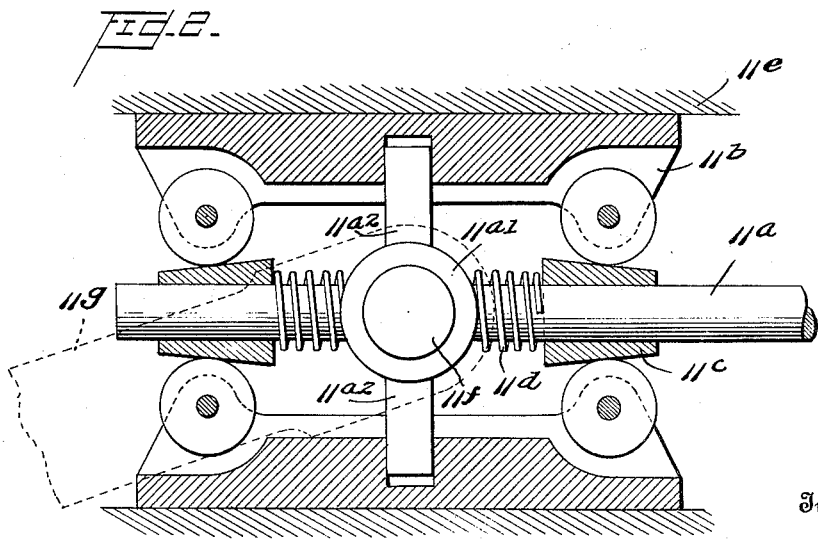

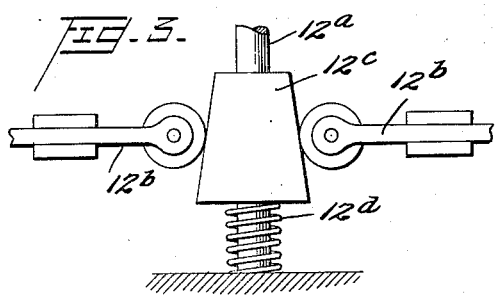
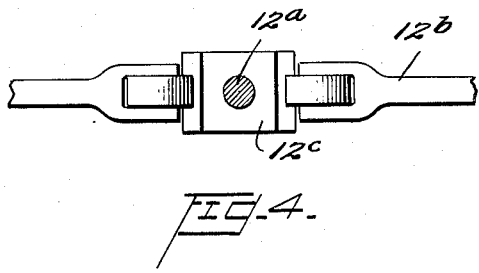
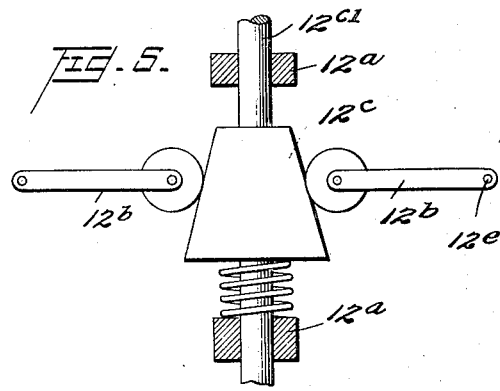
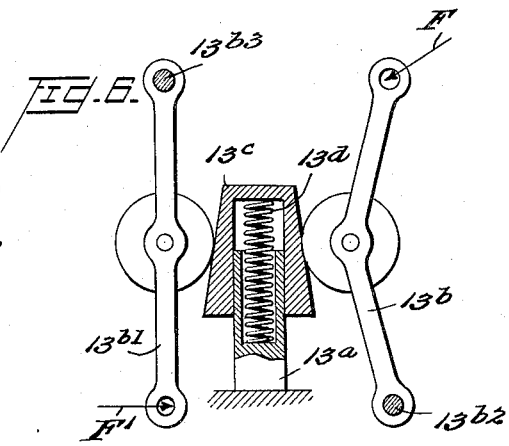
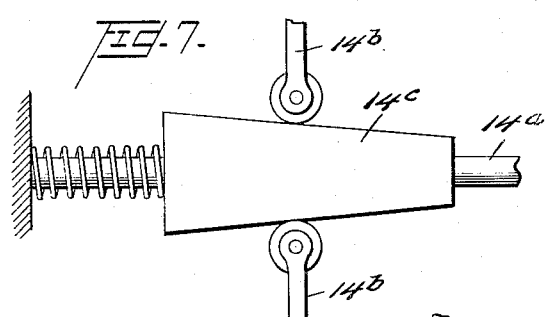
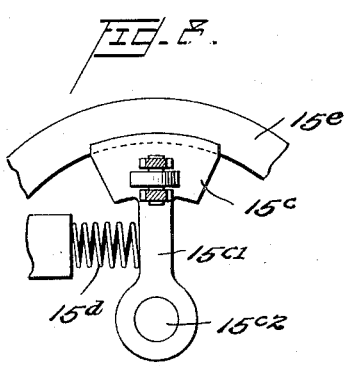
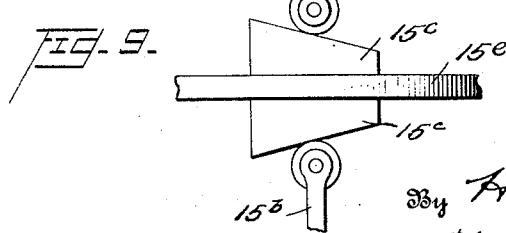

March 25, 1930. H. W. NIEMAN 1,751,646
MECHANICAL MOVEMENT
Filed Jan. 7, 1926   9 Sheets-Sheet 3

Inventor
By Henry W. Nieman
Watson, Coit, Morse & Grindle
Attorney

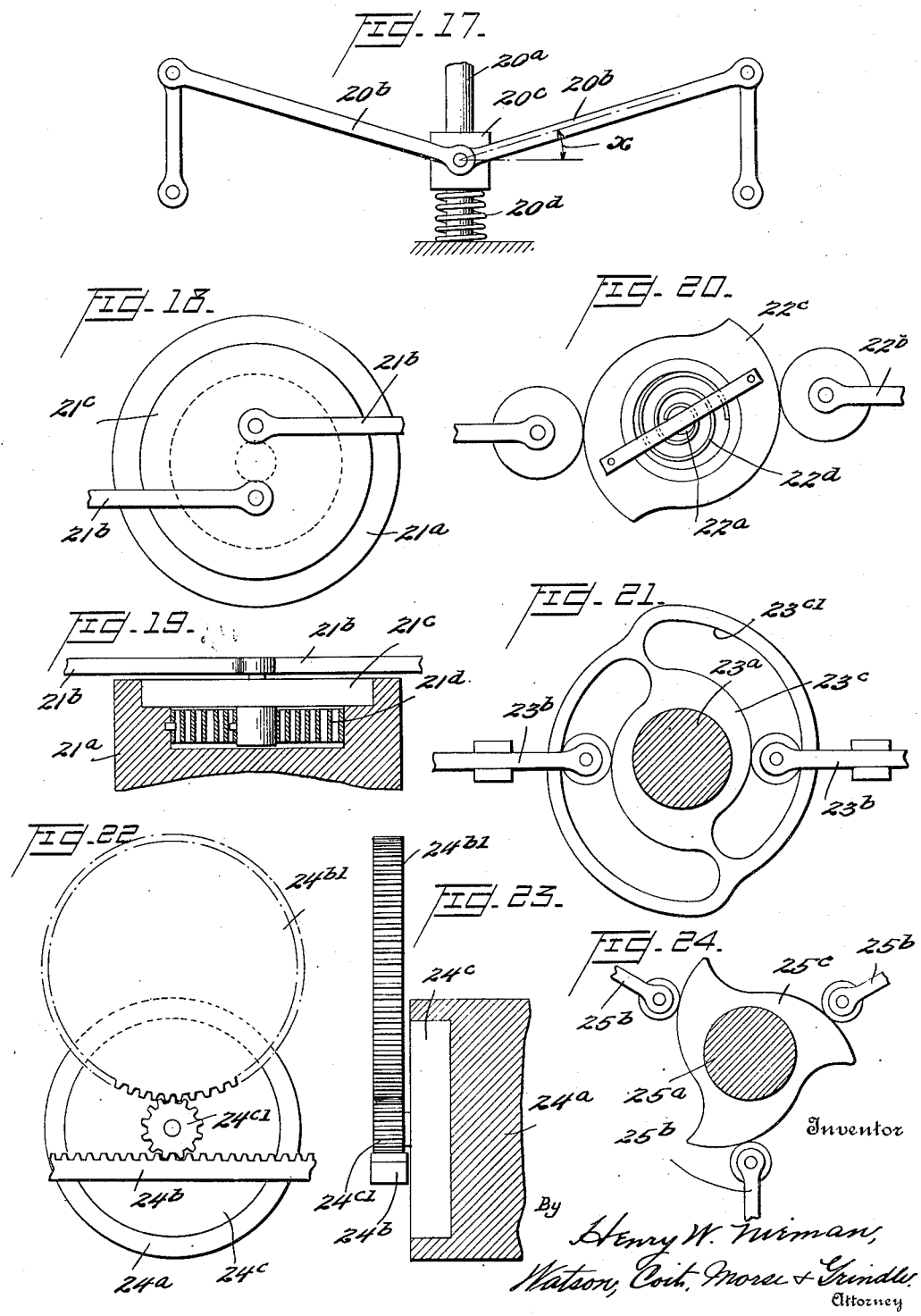

March 25, 1930. H. W. NIEMAN 1,751,646
MECHANICAL MOVEMENT
Filed Jan. 7, 1926   9 Sheets-Sheet 5
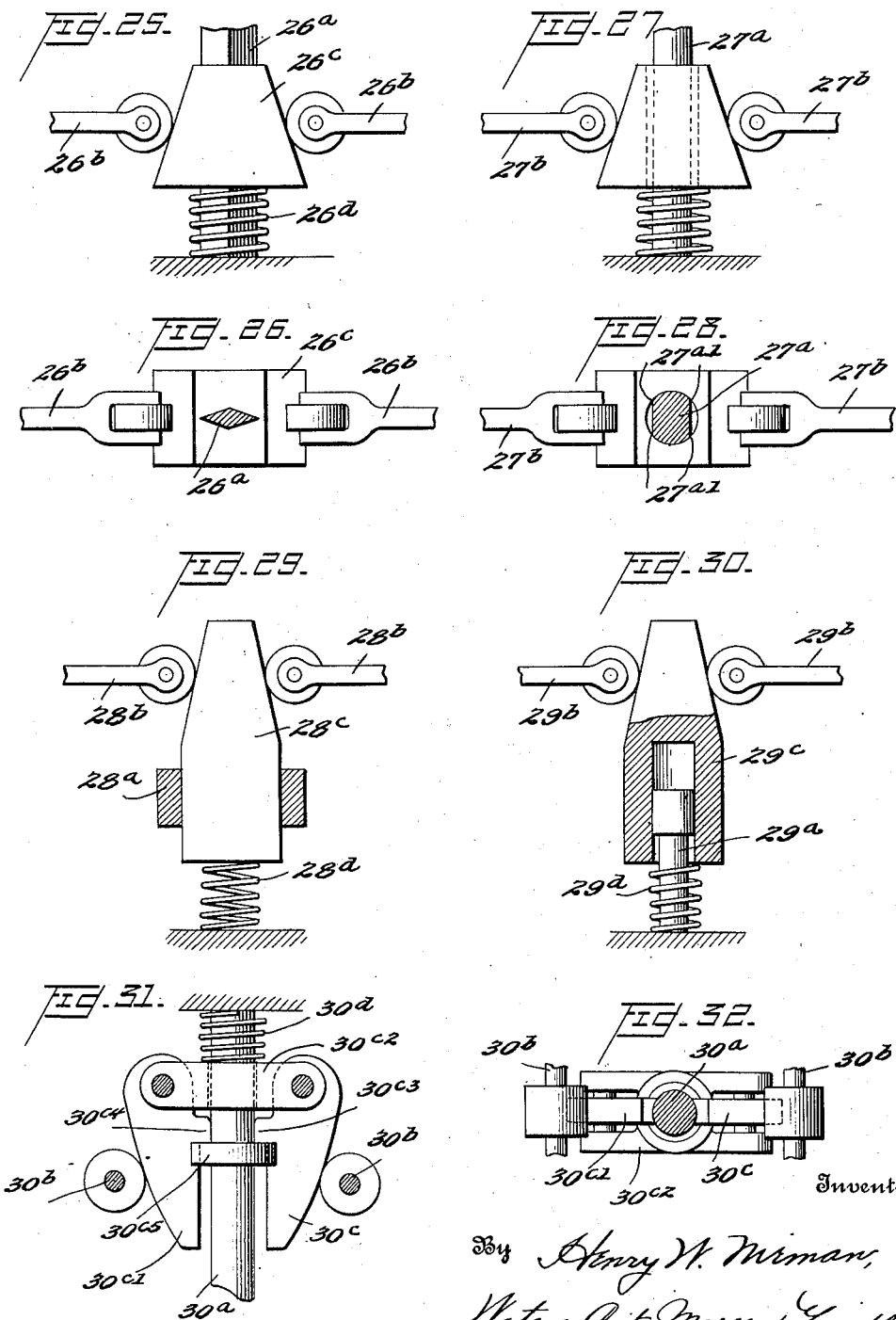

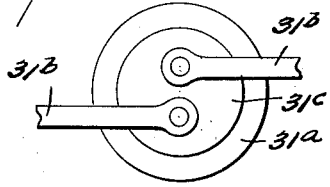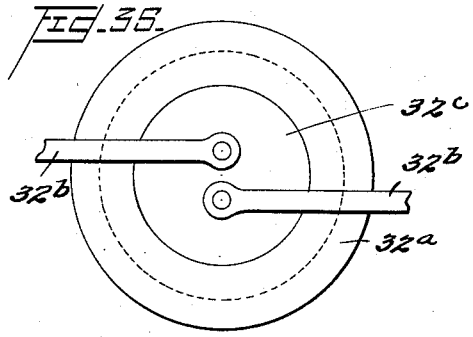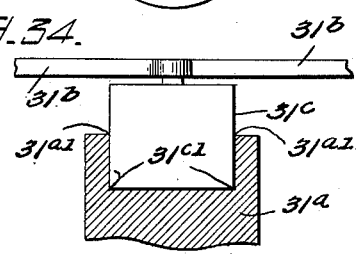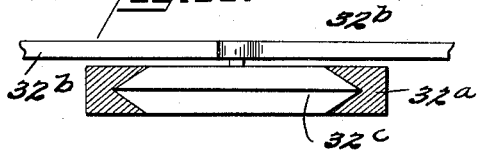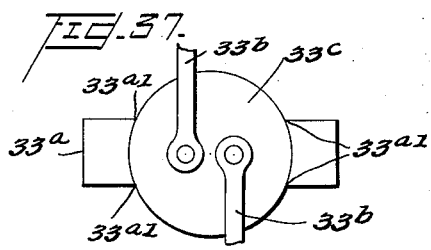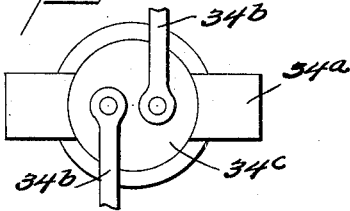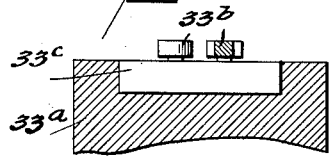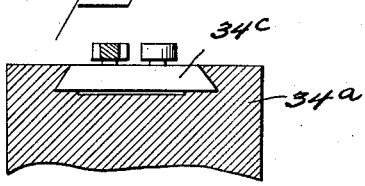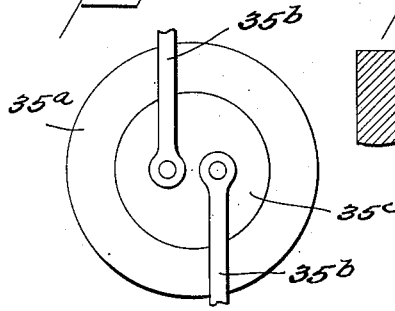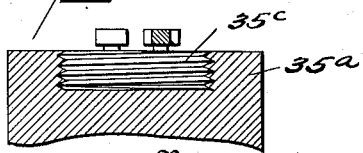

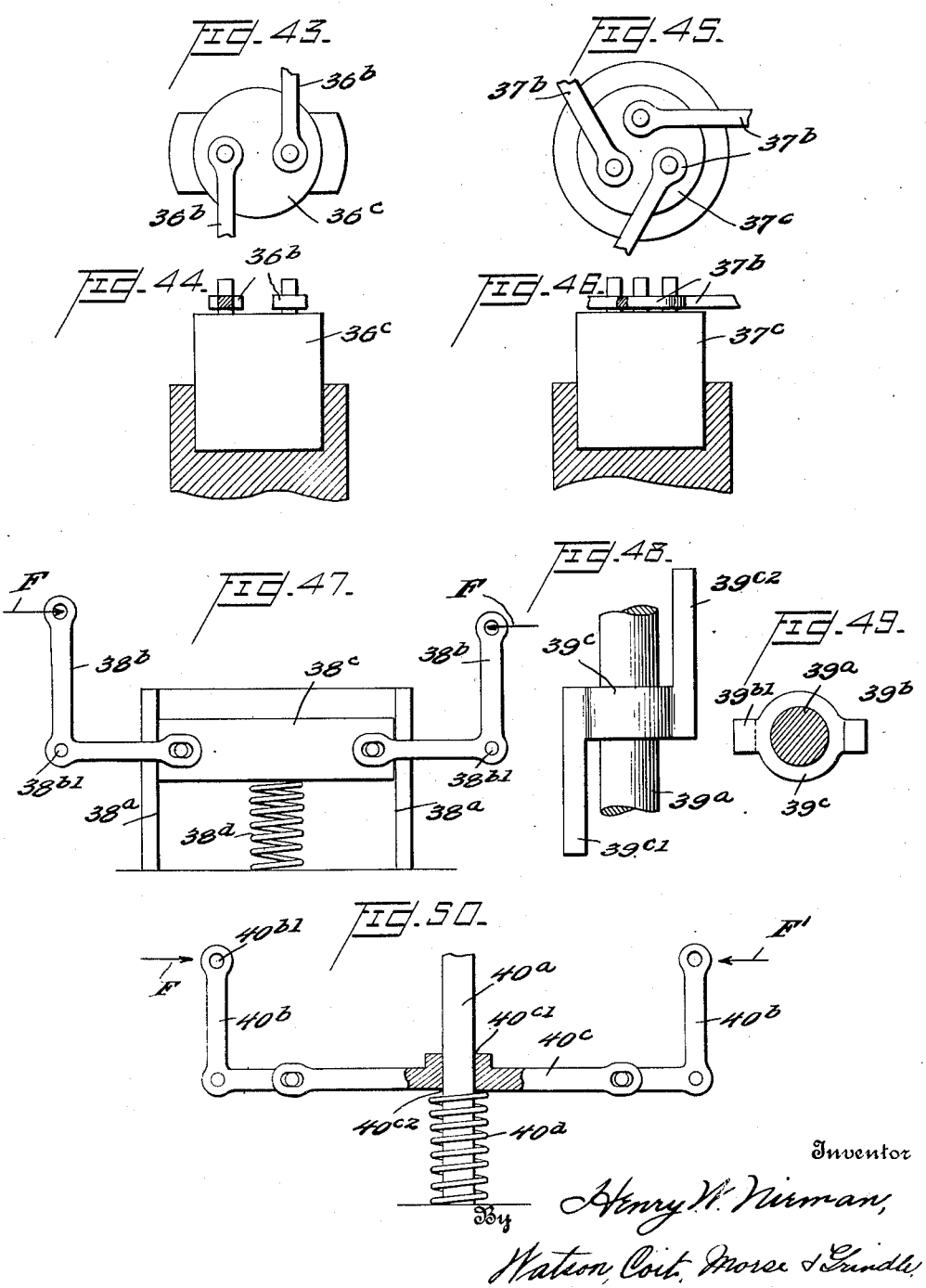

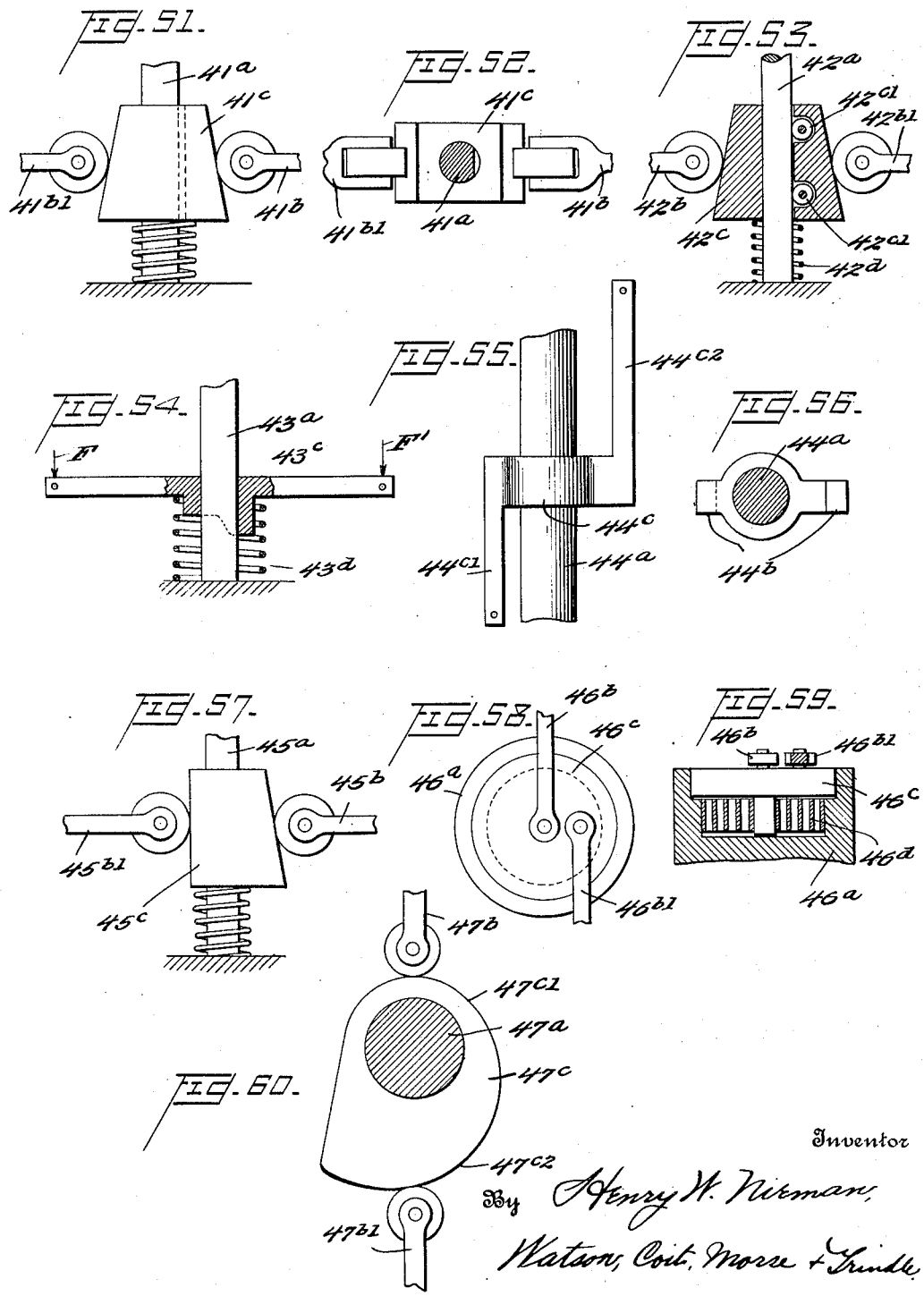

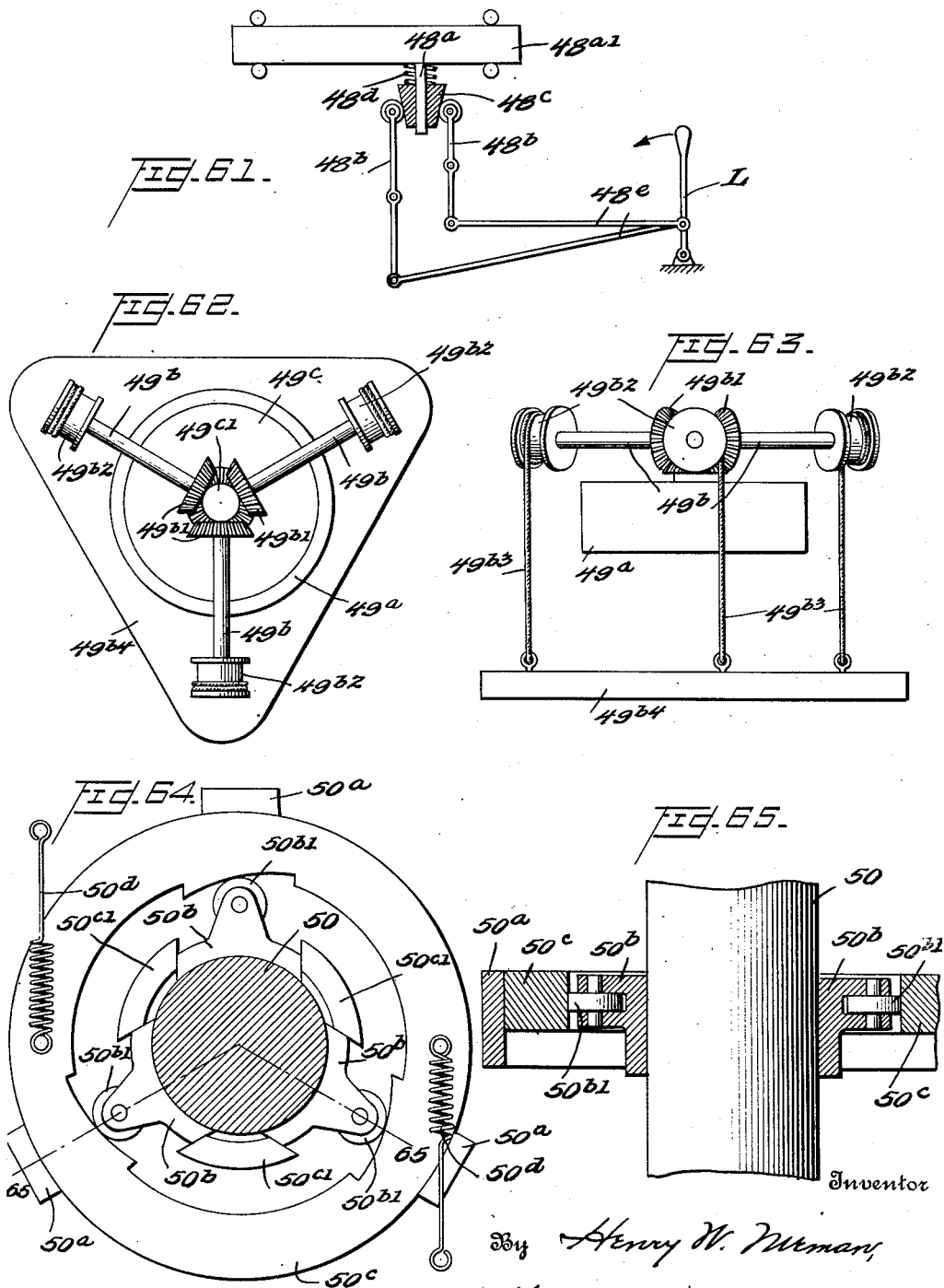

Patented Mar. 25, 1930

1,751,646

UNITED STATES PATENT OFFICE

HENRY W. NIEMAN, OF BETHLEHEM, PENNSYLVANIA

MECHANICAL MOVEMENT

Application filed January 7, 1926. Serial No. 79,737.

The present invention relates to mechanical movements.

The purpose of the invention, briefly stated, is to provide a mechanism which will detect and indicate the existence of a force acting in a predetermined direction when such force is the resultant of two or more forces transmitted thereto. More specifically stated, the object of the invention is to provide a device in the nature of an automatic adjusting means designed and constructed to permit relative movement of two or more force-transmitting elements when the resultant of the forces exerted by those elements is either a simple force acting within certain limits of direction, or a pair of forces tending to produce rotation and which may be an exact couple or which may differ therefrom to a predetermined extent, as hereinafter more fully set forth. The direction of a simple resultant force or the existence of an approximate resultant couple being determined not only by the relative magnitudes but also by the relative directions of action of the two or more applied forces, it is apparent that the invention not only provides a means for permitting relative movement of two or more elements movable along definite fixed paths when the magnitudes of the forces transmitted bear a predetermined relationship to each other, but also provides a means for bringing about relative movement of a plurality of force transmitting elements where the magnitudes of the transmitted forces do not vary but their directions of actions do vary relatively to each other.

The invention has many uses in the mechanical arts, and the principles thereof may be embodied in a large number of alternative forms of mechanical constructions. In the following description, the construction and mode of operation of a considerable number of alternative forms of mechanism, all of which forms embody the principle of the invention, is disclosed, but it will be understood that these various embodiments are advanced by way of example only, and that further adaptations may be devised to suit particular conditions, the invention not being limited in its scope to these physical embodiments which are described herein, and illustrated in the accompanying drawings and which are set forth for the purpose of enabling one skilled in the art to understand it and apply it to useful purposes.

The sixty-five figures of the drawings include illustrations of those embodiments which have been selected as representative of the many which might be devised. The drawings of such embodiments are largely diagrammatic, but are thought to illustrate the invention with the necessary completeness. Each modification, and the views illustrating the same, will be hereinafter described in detail. In addition to the drawings of the numerous modified forms of the invention, a force diagram is set forth (Figure 1) and several practical applications of the invention shown (Figures 2, 61, 62, 63, 64 and 65).

Each embodiment of the invention includes three elements which have counterparts, from the standpoint of functions performed, in all of the other embodiments. Thus each form includes a "means" which in most cases partakes of the nature of a supporting member, but which may include an associated spring or other yielding device, which may be either stationary or movable, and the "member" of which may not in fact in every instance comprise a support; a plurality of force transmitting elements; and a movable member upon which the elements act or which may act on the elements, which member is so designed and constructed as to move relatively to the "means" only (in the normal case) when the resultant of the forces transmitted thereto lies within predetermined limits as hereinafter defined. In the drawings, the exponent "a" is applied to each reference numeral placed to indicate the "means" above referred to, the exponent "b" is applied to the reference numerals placed to indicate the "elements" above mentioned, and the exponent "c" is applied to each of the reference numerals placed to indicate the "member" above mentioned.

In Figure 1, one form of the mechanical movement is diagrammatically shown and the forces acting thereon indicated by vectors so that these forces, and the action of the mechanism, may be graphically analyzed. A vetrically disposed rod is indicated at 10$^a$, a wedge shaped block slidably mounted thereon at 10$^c$, and elements for exerting oppositely directed forces on the respective inclined faces of the wedge means are indicated at 10$^b$, these elements being provided with antifriction rollers as shown. A spring 10$^d$ opposes downward movement of the wedge.

Assuming that two forces P and P' are exerted by the force-exerting elements 10$^b$ on the wedge, both forces acting toward the central rod 10$^a$, and that these forces are indicated by the vectors P and P' in Figure 1, it follows that there will be components of such forces normal to the rod 10$^a$, which may be represented by vectors H and H'. As a further condition, assume that P' is never greater than P, and again that the angle between the vectors H and P (and H' and P') is indicated by X.

Then $H = P \cos. X$, and $H' = P' \cos. X$.

The unbalanced pressure against the rod 10$^a$ normal to its axis will equal $H - H'$.

The frictional resistance to sliding where $f$ is equal to the co-efficient of friction of the wedge on the rod will be $f(H - H')$.

The total resistance to downward movement of the wedge on the rod will then be $f(H - H') + S$, where S is equal to the spring pressure.

The vertical components of P and P', always acting downwardly, are, respectively, H tan. X and H' tan. X, and therefore the total force tending to cause downward sliding of the wedge will be $(H + H') \tan. X$.

The wedge will therefore be on the point of sliding downwardly when $$f(H - H') + S = (H + H') \tan. X.$$

If a force is exerted on one face only of the wedge, i. e. by the force H alone, H' will be equal to zero and $fH + S = H \tan. X$, so that $$H = \frac{S}{\tan. X - f}.$$

Now if $f$ is greater than tan. X, H will be a negative quantity, which is contrary to assumptions on which the formulæ were based and therefore imaginary. Therefore no sliding can result from pressure from one side alone.

If $f = \tan. X$, H will be infinite, that is, no finite force will cause sliding.

If $f < \tan. X$, a finite force H from one side alone will cause sliding where $$H = \frac{S}{\tan. X - f}.$$

Assuming $H = H'$, then $H + H' = \frac{S}{\tan. X}$.

$\frac{S}{\tan. X}$ is always $< \frac{S}{\tan. X - f}$, that is, where tan. $X > f$, the sum of two equal forces applied on opposite sides will be less than the single force, which will cause sliding from one side alone.

As a practical example, take $$\tan. X = .25, f = .2, \text{ and } S = 10 \#$$

Then $H$ (acting alone) $= \frac{10}{.25 - .20} = 200\#$.

$H + H'$ (two equal forces) $= \frac{10}{.25} = 40\#$.

If H' were 15#, then H would be 65# etc.

In such cases, that is, where a mechanism is designed which is so proportioned that sliding of the wedge may be brought about by pressure upon one side alone, a portion of the reactive force necessary to prevent sliding under normal conditions must be supplied by the spring. When the force exerted against one side of the wedge exceeds a predetermined amount, that is, when working conditions become abnormal, the reaction due jointly to friction and spring action is overcome and sliding results. While in the great majority of instances, I prefer to utilize mechanisms in which sliding of the wedge (or movement of an equivalent structure) can be brought about only by concurrent action of at least two force applying elements yet, where it is desired to prevent the transmission of excessive single forces it may be quite advantageous to so design the parts that movement of the movable member under the influence of a single force may occur. Possible breakage of the mechanism due to excessive single applied forces is thereby avoided.

The spring is on the point of causing upward movement of the wedge when $S = (H + H') \tan. X - f(H - H')$. If the two side forces are equal, the last term disappears and $$\frac{S}{\tan. X} = H + H'.$$

The mathematical development of this form of the invention has been given in considerable detail because the principles involved apply to all types with obvious modifications. In the more complicated types a mathematical treatment would be very involved and would moreover be of little practical use, since the desired proportions can easily be determined by trial. For the sake of simplicity in the descriptions of the other types, it is assumed that the proportions are such that slippage due to pressure from one side alone will not occur, and the effect of the spring pressure in hindering movement, where a spring is employed, is not specifically mentioned.

It will thus be seen that the wedge 10$^c$ will slide downwardly on the rod 10$^a$ when the forces exerted by elements 10$^b$ are equal or substantially equal within the meaning of the mathematical demonstration set forth above, while no movement of the wedge will occur if the opposing forces are unbalanced. It therefore follows that the wedge will constitute a fixed abutment when only one of the elements $10^b$ is active, so that the force of this element is transmitted to the support, while, when both elements are active, the wedge will move downwardly and no force will be transmitted to the support.

A practical application of the mechanical movement to a locomotive crosshead is shown in Figure 2, again rather diagrammatically. A piston rod $11^a$ is provided with a boss $11^{a'}$ near its free end, which boss constitutes a bearing for the connecting rod pin $11^f$, and which also carries the oppositely directed studs $11^{a2}$. The shoes $11^b$ slide on slideways $11^e$, being propelled by the studs $11^{a2}$, the ends of which fit into sockets in these shoes. Each shoe carries a pair of rollers, one at each end, the opposing rollers of the respective pairs bearing against wedges $11^c$ slidably mounted on the piston rod and normally pressed outwardly by springs $11^d$. The action of the springs maintains the shoes in light sliding contact with the respective slides.

If in the first instance all of the parts of the crosshead are accurately made, equal wear of each slide will be taken up by movements of the wedges, so that the piston rod remains exactly centered. At the same time the wedges will be unyielding to the side thrust of the connecting rod, $11^g$ since these thrusts will be from one direction or the other and never from both directions at the same time. It is obviously necessary that pressures be exerted by the rollers simultaneously on either one of the wedges from opposite sides before that wedge will yield. The crosshead illustrated is designed particularly for use with engines having vertically disposed pistons. Where the pistons are disposed horizontally, it is necessary to take into consideration the weight of the parts, and this will require minor alterations in the design and construction of the component elements of the crosshead, although it involves no departure in principle.

Figures 3 and 4 illustrate in elevation and plan view respectively, an embodiment of the invention substatnially the same as that illustrated diagrammatically in Figure 1, the movable "means" comprising a wedge $12^c$ slidably mounted upon a rod or support $12^a$ and acted upon by elements $12^b$. A spring $12^d$ serves to maintain the wedge in the position shown, but permits downward movement thereof when both elements $12^b$ become active simultaneously.

A very similar embodiment of the invention is illustrated in Figure 5, but here the wedge $12^c$ is rigidly mounted upon the rod $12^{c'}$ which slides in aligned apertures in member $12^a$. The force transmitting elements $12^b$ are shown to be pivotally mounted at $12^e$. The action of the wedge is, however, exactly the same as that shown in Figures 3 and 4.

That form of the invention illustrated in Figure 6 functions substantially in the manner of the form shown in Figures 3, 4 and 5. The spring $13^d$, however, is partially contained within a recess in the top of support $13^a$ and partially in a recess in the bottom of wedge member $13^c$, the wedge member telescoping the support. The force transmitting elements $13^b$ and $13^{b'}$ are pivotally supported at $13^{b2}$ and $13^{b3}$, respectively, and forces are exerted at their free ends in the directions indicated by arrows F and F'. It is thus seen that the direction of movement of the anti-friction rollers is not on a straight line through their centers as in the form disclosed in Figures 3 and 4. As the pressure exerted by a roller on a plane surface is always normal to the surface, obviously it is of no consequence how the rollers are guided or in what direction the forces are applied by the force transmitting elements. It is possible also to position the spring in various ways, it being only necessary that the spring impart a movement to the wedge in a direction parallel to the support. Likewise it is possible to avoid the use of a spring by utilizing other means for imparting return movement to the wedge, both in the construction illustrated in Figure 6, and in the constructions previously described and in those yet to be described in the following paragraphs. For instance, the wedge may be inverted so that it will return after actuation under the influence of gravity, or a frictional contact of the wedge may be made with some outside moving part. Other means may be selected to replace the spring in adapting the invention to suit various conditions.

In some cases it is desirable to provide a wedge which will move only when the opposing forces are very nearly equal. The wedge $14^c$ shown in Figure 7 has its inclined surfaces only slightly tapering. The smaller the angle which the inclined faces make with the axis of the supporting rod $14^a$, the more sensitive the action of the device will be, that is, the more nearly equal the forces $14^b$ must necessarily be before sliding occurs.

In Figures 8 and 9, the wedge $15^c$ is shown to be mounted upon a member $15^{c'}$ rotatably supported on an axle $15^{c2}$. The wedge frictions against a segment $15^e$, being slotted to receive the segment. Pressure of either of the force transmitting elements $15^b$ alone will cause the wedge to bear against the segment and no movement will result. Concurrent pressure of both elements $15^b$ will relieve the friction of the wedge on the segment and cause the same to revolve about its axis in an anti-clockwise direction against the action of spring 15$^d$.

Figure 11:
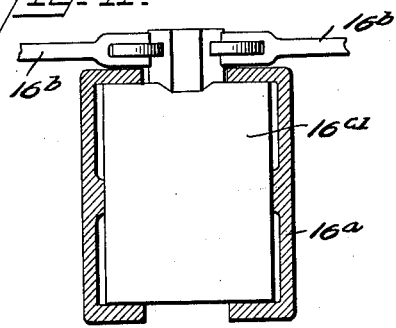

The wedge 16$^c$ in the embodiment illustrated in Figures 10 and 11 is shown to be rigidly mounted upon a cylinder 16$^{c'}$ rotatably supported in bearings 16$^a$. Pressure of one only of the force applying elements 16$^b$ will cause the cylinder to friction heavily against the bearings so that no rotation will result. Concurrent action of both force supplying elements relieves this friction so that rotation of the cylinder follows. The spring 16$^d$ serves to return the wedge to normal position.

Figure 12:
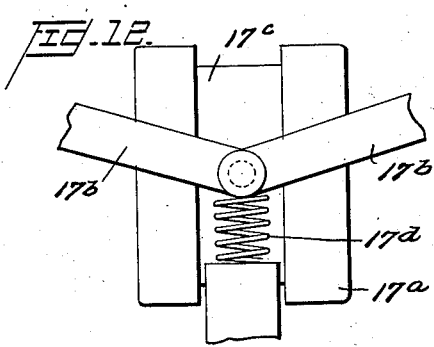
Figure 13:
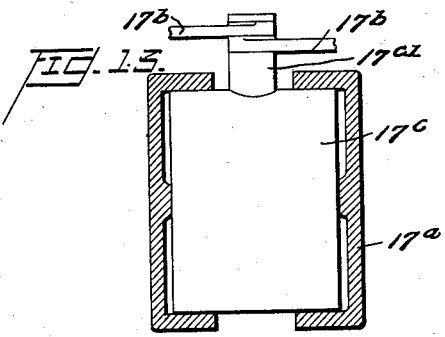

Substantially the same action occurs in the embodiment of the invention illustrated in Figures 12 and 13. In this form, however, the cylinder 17$^c$, which is rotatably supported in bearings 17$^a$, is provided with an integral stud 17$^{c'}$ instead of a wedge member, and to this stud the two force transmitting elements 17$^b$ are pivotally connected. Pressure exerted by either member 17$^b$ alone will cause the cylinder to bind in the bearings while pressure along both such members concurrently will relieve this friction and cause the cylinder to revolve. The spring 17$^d$ may be employed to return the cylinder after such rotation, but this spring may be dispensed with in the event that the device is to be double acting. It is obvious that when the members 17$^b$ are simultaneously placed under tension, the cylinder will rotate in a direction opposite to that in which it moves when the elements are placed under compression, and that when one only of the members 17$^b$ is placed under tension, the cylinder will bind in the bearings.

Figure 14:
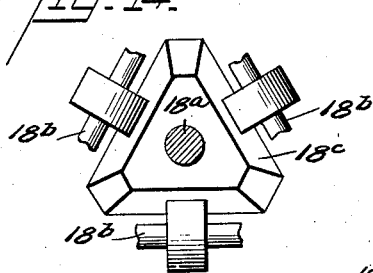
Figure 15:
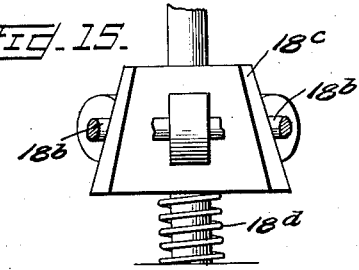

In Figures 14 and 15, a three-sided wedge 18$^c$ is shown, but the action here is not different from that form of wedge shown in Figures 3 and 4, except in that it is necessary that all three rollers act concurrently to effect sliding of the wedge.

Figure 16:
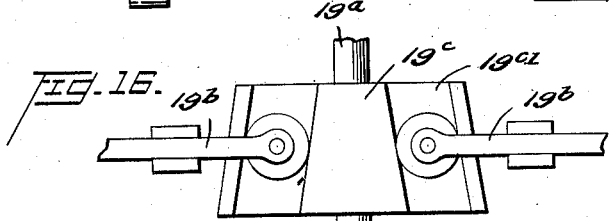

The mechanism shown in Figures 3 and 4 may be made double acting, and the use of a spring avoided, by adopting the construction shown in Figure 16. Here it will be seen that the wedge 19$^c$ is provided with guideways 19$^{c'}$ for the antifriction rollers of the force transmitting elements 19$^b$. Concurrent inward movement of elements 19$^b$ will cause downward movement of the wedge. Concurrent outward movement of members 19$^b$ will cause upward sliding of the wedge. Action of one member 19$^b$ alone, in either direction, will be ineffective to cause wedge movement.

The embodiment of the invention shown in Figure 17 acts in principle as does that form illustrated in Figures 3 and 4. Here, however, the force transmitting elements 20$^b$ are pivoted to the sleeve member 20$^c$, which is slidably mounted on the rod 20$^a$. As in the preceding cases, sliding movement of member 20$^c$ on the rod 20$^a$ occurs, or does not occur, according to the relations of the various forces and the coefficient of friction. If sliding is to be prevented upon the action of one member 20$^b$ alone, the angle X between the said member and a normal to the rod 20$^a$ must be less than the sliding angle representing the coefficient of friction. If, however, forces are applied along both members 20$^b$, the friction will be overcome or neutralized sufficiently to permit sliding. In this construction the spring 20$^d$ may be a compression spring if pressure is applied along the elements 20$^b$, or it may be a tension spring (or a compression spring acting in the opposite direction) if tension is to be applied through the elements 20$^b$. It is obvious furthermore that the spring may be omitted in the event that it is desired to have the device double acting.

A further form of the mechanical movement is shown in Figures 18 and 19. Here the movable member 21$^c$ comprises a circular disk rotatably mounted in a collar or socket 21$^a$. A coil or clock spring 21$^d$ acts as a return spring, turning the member 21$^c$ in a clockwise direction after it has been actuated. Force transmitting elements 21$^b$ are pivoted eccentrically to the disk as shown, the pivotal points being equidistant from the center of the disk. If force be applied by means of one of the elements 21$^b$, this will tend to revolve the disk 21$^c$ within the socket 21$^a$, but such motion will not result if the friction between the disk and the socket cannot be overcome by the torque exerted by the applied force, and this friction may easily be made great enough to prevent rotation by pivoting the members 21$^b$ sufficiently close to the center of the disk 21$^c$. If, however, forces are concurrently applied through both members 21$^b$, the pressure of the member 21$^c$ against the walls of the socket 21$^a$ will be wholly or partially counterbalanced or neutralized, and the product of these forces and the coefficient of friction of the member 21$^c$ on the edges of the socket reduced to an extent that will permit the member 21$^c$ to revolve. It is obvious that with this construction the spring may be caused to apply its pressure in an anti-clockwise direction, in which case the entire action will be reversed. Tension in the elements 21$^b$ will cause the movable member 21$^c$ to revolve in a clock-wise direction against the spring pressure, whereas relaxation of tension in these members will allow the spring to rotate the member in an anti-clockwise direction, in which case the member 21$^c$ will revolve if either simultaneous pressures or tensions are applied through elements 21$^b$, but will not yield to either a pressure or a tension applied to one of the members, or to a pressure to one member and a tension applied to the other. The device may therefore be said to be adapted for double action, and when it is intended to be so used the spring may be omitted.

In Figure 20 a construction is shown in which the force imparting elements 22$^b$ act, not on a wedge or disk, but on a member 22$^c$ which turns on a pivot 22$^a$. The periphery of member 22$^c$ includes two involute curves. A spring 22$^d$ tends to turn the member 22$^c$ in a clockwise direction. A property of the involute is that the normal is always tangent to its generating circle, which in this case is concentric with the pivot 22$^a$ and therefore always passes the same distance away from this center no matter how far the member 22$^c$ is turned from the position shown. When, therefore, pressure is applied by one of the elements 22$^b$, the pressure will be along a line normal to the edge of member 22$^c$, and this member will tend to turn in an anti-clockwise direction. There will, however, exist a certain friction of the member 22$^c$ on the member 22$^a$, and if the pivot member is sufficiently large in comparison with the generating circle the friction will be great enough to prevent the revolution of the member 22$^c$ under the pressure applied. If, however, both members 22$^b$ act simultaneously, this pressure is relieved and the tangential forces cause an anti-clockwise rotation of member 22$^c$.

When a double acting device of the type shown in Figure 20 is desired, involute grooves instead of plane involute surfaces are provided, as shown in Figure 21. Here the rotatable member 23$^c$ is provided with involute grooves 23$^{c\prime}$ within which the anti-friction rollers of member 23$^b$ lie. Action of either force transmitting element 23$^b$ will not result in rotation of member 23$^c$ on pivot 23$^a$, but simultaneous action of both such elements, either toward or away from each other, will cause rotation of this member.

In the forms of the invention described in the foregoing paragraphs, the movable member has always had a limited range of movement. By modifying the force transmitting elements, however, and selecting a rotatable movable member, it is possible to provide a device in which the movable member will have a lengthened or unlimited movement. Such a construction is shown in Figures 22 and 23. Here a disk 24$^c$ is rotatably mounted in a cylindrical recess or socket in the supporting member 24$^a$, and a pinion 24$^{c\prime}$ rigid and coaxial with the disk is acted upon by a rack 24$^b$ and a gear 24$^{b\prime}$. As in the case of the form shown in Figures 18 and 19, the disk 24$^c$ will only rotate when both rack and gear are operating in opposite directions on the pinion. Obviously the device is double acting, and it is further apparent that by substituting a second gear for the rack illustrated the rotatable member may have unlimited movement in either direction.

The device shown in Figure 24 is similar in operation to that illustrated in Figure 20, but instead of having two involute edges the rotatable member 25$^c$ is provided with three such edges. By properly designing the involute edges of member 25$^c$ in relation to the fixed pivot 25$^a$, for any particular coefficient of friction between these two parts, the member 25$^c$ can be made unyielding to any pair of force transmitting elements, but will readily yield to a pressure applied to all three, or member 25$^c$ may be designed so as to be unyielding to one of the elements when acting alone but to yield to any pair or to all three when acting concurrently.

That form of the invention illustrated in Figures 25 and 26 is very much the same as the form shown in Figures 3 and 4. Instead of having a round support (in cross-section) for the wedge to slide upon however, a rod 26$^a$ of diamond shape in cross-section is provided. With a construction of this kind, the amount of friction between the wedge 26$^c$ and the rod 26$^a$ is increased so that the sides of the member 26$^c$ may have a greater inclination to the axis of rod 26$^a$ without resulting in slipping under the action of one of the force transmitting elements 26$^b$.

In Figures 27 and 28 a device is shown which is generally similar to that illustrated in Figures 25 and 26, but here the rod 27$^a$ is generally circular in cross section, with flattened faces. In this case binding friction will prevent slipping of the wedge on the rod when one only of the force transmitting elements 27$^b$ is active, the binding occurring along the edges 27$^{a\prime}$, and this friction will be materially greater than if the rod were round in cross-section without flattened faces.

The wedge 28$^c$ shown in Figure 29 is vertically slidable in a bearing member 28$^a$, and its inclined faces are acted upon by the usual force imparting elements 28$^b$. Action of one member 28$^b$ alone will result in binding or cramping of the wedge in its bearing, while action of both simultaneously will force the wedge downwardly against the action of spring 28$^d$.

A somewhat similar construction is shown in Figure 30, but here the movable wedge member 29$^c$ is provided with an axial recess which receives the supporting rod 29$^a$. Action of one only of the elements 29$^b$ will cause cramping of the wedge on the supporting rod, while simultaneous action of the wedge on these members will cause depression of the wedge against the action of spring 29$^d$.

A wide range of complex adaptations of any of the above constructions may be arranged with a purpose of giving greater mechanical advantage to the several parts through leverages and linkages without departing from the spirit of the invention.

A complex device of this kind is shown in Figures 31 and 32. Here the wedge comprises two portions 30$^c$ and 30$^{c\prime}$, pivoted to the crosspiece 30$^{c2}$. Lugs 30$^{c3}$ and 30$^{c4}$ on the wedge sections respectively are arranged to press against the supporting rod 30$^a$ on which the cross member 30^c2 slides. Force transmitting elements 30^b are adapted to act against the curved faces of the wedge sections. If one of these elements acts alone, the corresponding lug 30^c3 or 30^c4 will press against the rod 30^a, drawing the opposite face of crosspiece 30^c2 against the rod by a lever action, the member 30^c2 gripping the rod with a powerful friction. If both elements 30^b act simultaneously, the wedge sections 30^c and 30^c' are pressed against opposite sides of a spacing ring 30^c5, the outside diameter of which is just sufficient to hold lugs 30^c3 and 30^c4 out of contact with the rod 30^a. No friction against the stem results, therefore, and an upward movement of the wedge occurs. The faces of the wedge portions should be curved as shown, since at various points of movement of the sliding parts along the stem the elements 30^b, which are stationary, act with different mechanical advantages, which will necessitate a change in the angle of contact of the elements with the wedge faces if the characteristics of the device are to be identical at all points in its travel. A spring 30^d is used to return the device after actuation.

In the embodiment of the invention illustrated in Figures 33 and 34, the movable member 31^c is shown to be cylindrical and only partially extends into a cylindrical recess in member 31^a in which it is rotatably supported. When one of the force transmitting members 31^b alone is acting, rotation of member 31^c will be prevented not only because of friction as in the case of the device shown in Figures 18 and 19, but because of tilting of this member with consequent binding at the points 31^a' and 31^c'. In a device of this character the force transmitting elements 31^b may be pivotally connected to the rotating member 31^c at a somewhat greater distance from the center of the latter member than in the case of the form shown in Figures 18 and 19.

Where the movable member is a disk, its edges may be beveled as in the case of the rotatable disk 32^c shown in Figures 35 and 36. The coefficient of friction between the disk and supporting member 32^a is therefore increased.

In Figures 37 and 38 a modification of the device illustrated in Figures 18 and 19 is disclosed. Here the supporting member 33^a, instead of being a circular enclosing member, is so formed as to confine the rotatable member 33^c only on opposite sides, as shown. The force transmitted by one of the elements 33^b when acting alone will not only cause the disk to frictionally engage the support as in the case of the modification of Figures 18 and 19, but an intensified friction will be caused by the engagement of the member 33^c with the edges 33^a' of member 33^a.

The rotatable disk member of Figures 37 and 38 may have its edges beveled. Such a device is illustrated in Figures 39 and 40, in which the disk 34^c has beveled edges, the edges of the opposed portions of the supporting member 34^a being undercut as shown. The coefficient of friction between the disk and its support is thereby increased, but the action here is substantially the same as in the case of the form shown in Figures 37 and 38.

A somewhat similar device is shown in Figures 41 and 42, but here the supporting member 35^a completely encircles the rotatable member 35^c, and the contiguous faces of members 35^a and 35^c are provided with inter-engaging screw threads, as shown. The coefficient of friction between the rotatable and stationary members is greatly increased by threading in this manner.

Figures 33 to 42 illustrate mechanisms which may be either double acting or single acting. In the event they are single acting, that is, active only in one direction, a spring should be provided for returning them to their initial positions.

A device which is the combination of those illustrated in Figures 33, 34 and 37, 38 is illustrated in Figures 43 and 44. Here there is not only frictional resistance, but also binding or cramping.

By means of such a construction it is possible to place the pivot points of the force transmitting members 36^b at a considerable distance from the axis of rotation of member 36^c without danger of slipping when one only of members 36^b is acting.

In Figures 45 and 46, the same idea is carried out with three force transmitting elements 37^b acting on the rotary member 37^c instead of two only as in the form just described. In the last two embodiments of the invention, return springs may be used if thought desirable, but obviously the device is double acting when such springs are not employed.

Figure 47 discloses a form of the invention in which the rectangular movable member 38^c is slidable between guideways 38^a. Bell crank levers 38^b are designed to impart forces to member 38^c, these bell crank levers being pivotally supported at 38^b'. Obviously action of one bell crank alone will cause cramping of the movable member within its guide, and hence produce no downward movement of member 38^c. Simultaneous action of the bell cranks, however, under the influence of forces such as indicated by the vectors F, will produce downward movement of the member 38^c against the action of the spring 38^d.

In Figure 48 a supporting shaft 39^a of relatively large size is shown and on this shaft is rotatably mounted a sleeve 39^c having oppositely extending arms 39^b and 39^b'. If pressure is applied at the end of one arm only, tending to rotate the sleeve 39°, no movement of the sleeve will result, the arms being sufficiently great in length, in relation to the length of the sleeve, to cause binding of the sleeve on the shaft. If pressures are exerted simultaneously on the ends of the arms $39^b$ and $39^{b'}$, and tending to rotate the sleeve $39^c$ in one direction, it will so rotate, the friction being relieved by the balancing of the pressures in this manner.

A device somewhat analogous to that shown in Figure 47, is shown in Figure 50. Here the movable "means" or member is indicated at $40^c$, and this member has a sleeve-like central portion which is slidably mounted upon the supporting rod $40^a$. Bell crank levers $40^b$ are positioned to apply forces to the ends of the horizontally extending movable member $40^c$. When force is applied at the point $40^{b'}$ in the direction of the arrow F, the member $40^c$ will be tilted slightly, but, where member $40^c$ is designed approximately as shown, particularly with respect to the length of its two arms, and the vertical dimension of the central sleeve which surrounds the rod $40^a$, almost the whole of the thrust will be exerted at the points $40^{c'}$ and $40^{c2}$, and the friction which results will prevent sliding of the member downwardly upon the support. If, however, a force F' is applied to the bell crank lever $40^b$ simultaneously with the force F, the friction of the member $40^c$ on member $40^a$ will practically disappear and member $40^c$ will move downwardly against the action of spring $40^d$. Of course the spring may be placed above member $40^c$ instead of below it, in which case the forces F and F' should be reversed to cause movement of member $40^c$. The spring may be omitted entirely if the device is to be double acting.

In those forms of the invention which have been described up to this point, movement of a movable member is brought about by concurrent action upon said member of two or more forces equal or substantially equal in magnitude. Under certain conditions it may be desired that the member be caused to move when the forces are not equal in magnitude, but bear some approximate relationship to each other. A device of this kind is illustrated in Figures 51 and 52, in which a wedge $41^c$ is shown to be slidably mounted upon a rod $41^a$ which has one side flattened. Otherwise the mechanism is as illustrated in Figures 3 and 4. As a result, a heavy pressure of the force transmitting element $41^{b'}$ may be counterbalanced by a relatively light pressure of the force transmitting element $41^b$ in order to cause a movement of the wedge, but a heavy force applied through element $41^b$ necessitates the application of a force almost as heavy through member $41^{b'}$ before movement will result.

In Figure 53, the supporting rod $42^a$ is round, but the wedge $42^c$ is provided with internal antifriction rollers $42^{c'}$ on one side. Pressure applied through element $42^b$ cannot cause motion of the wedge unless accompanied by simultaneous pressure from the opposite side through element $42^{b'}$, but pressure of element $42^{b'}$ can cause downward movement of the wedge against the action of spring $42^d$ whether or not element $42^b$ is active.

A device somewhat similar to that shown in Figure 50 is illustrated in Figure 54, the sleeve-like central portion of member $43^c$, however, having opposed bearing surfaces of unequal length. To procure a downward sliding movement of member $43^c$ against the action of spring $43^d$, forces must be applied simultaneously, as indicated by vectors F and F' but these forces need not be equal nor approximately equal, downward movement resulting when force F' is considerably smaller than force F.

The device shown in Figure 55 is similar to that shown in Figure 48, except that the arms $44^{c'}$ and $44^{c2}$ are not equi-distant from the shaft $44^a$ nor are they equal in length. A downward force on the end of arm $44^{c2}$ must be balanced by a considerably greater upward force on the end of arm $44^{c'}$ before rotation of sleeve $44^c$ will occur.

In Figure 57 a wedge is shown which is provided with a face parallel with the supporting rod $45^a$ and a face inclined to the rod. In this case the pressure of either member $45^b$ or $45^{b'}$ will cause no movement of the wedge $45^c$, while simultaneous pressure will cause movement. This movement is brought about, however, not as in previous cases, since during the movement of the wedge only one of the elements $45^b$ will move inwardly. There is here no dissymmetry of the applied forces, but a dissymmetry of movement in the force transmitting members.

In Figures 58 and 59 the rotatable disk member $46^c$ is mounted, as in certain previously described forms of the device, in a cylindrical recess in the supporting member $46^a$. A spring $46^d$ normally tends to hold the disk in a definite position. It will be seen, however, that one of the force transmitting elements, $46^b$, is pivoted to the disk exactly at its center, while the other element $46^{b'}$ is pivoted eccentrically thereto. To effect rotation of the disk, forces must be simultaneously exerted by the force transmitting elements, but it will be seen that when such rotation occurs, element $46^b$ will not move, whereas element $46^{b'}$ will move. There is, therefore, dissymmetry of movement.

Dissymmetry of movement of the force transmitting elements also occurs in the structure illustrated in Figure 60. Here the rotatable member $47^c$ has a circular edge portion $47^{c'}$ and a cam shaped edge portion $47^{c2}$ (an involute curve). The force transmitting elements $47^b$ and $47^{b'}$ act against these faces respectively. Pressure of either element alone will cause the member 47$^c$ to friction against the supporting pivot 47$^a$ and no movement will result. When pressure is applied by both elements concurrently, this friction is removed and revolution of member 47$^c$ follows, owing to the tangential force set up by the pressure of member 47$^{b\prime}$ against the involute face. It will be seen, however, that during such movement element 47$^{b\prime}$ is the only element which moves.

An application of the device to a linkage is shown in Figure 61. Here the supporting rod 48$^a$ is integral with a member 48$^{a\prime}$ which may actuate a valve or do other useful work, and the wedge 48$^c$ is normally forced downwardly on rod 48$^a$ by the spring 48$^d$ to bear against two rollers upon the spaced upper ends of levers 48$^b$.

A manually operable lever for actuating levers 48$^b$ is indicated at L, this lever being connected to levers 48$^b$ by suitable links 48$^e$. Movement of the lever L in one direction will obviously cause one of the levers 48$^b$ to act on the wedge to move the member 48$^{a\prime}$ in the opposite direction, no slippage of the wedge occurring. If at any time such binding or tightness in the system should occur as would result in both levers 48$^b$ pressing on the wedge simultaneously, the wedge will move upward to relieve the strain. If, on the other hand, owing to wear in the pivots of the linkage, the rollers of levers 48$^b$ become further separated, the wedge automatically moves downwardly to take up the lost motion. Such downward movement of the wedge, however, will occur only when the linkage is not being operated.

In the mechanism shown, assuming that the pivots throughout the linkage wear equally in use, the adjusting means will distribute the adjustment equally between them and maintain the relation between the lever L and the member 48$^{a\prime}$ unchanged. As the spring 48$^d$ need only be a very light one, there will be no heavy pressures on any of the pivots excepting when heavy power is actually being transmitted. Owing to the fact that there is only very slight movement at any time between the wedge 48$^c$ and rod 48$^a$, there will be no appreciable wear between these parts.

In Figures 62 and 63 a mechanism for insuring uniform loading of a platform is disclosed, which mechanism embodies the principles of operation of that embodiment of the invention shown in Figures 22 and 23. Here the rotatable disk member 49$^c$ is supported in a cylindrical recess in supporting member 49$^a$ and has a bevel gear 49$^{c\prime}$ coaxial and integral therewith. Each of the rotatable shafts 49$^b$ is provided with a bevel gear 49$^{b\prime}$ which gears mesh with the beveled gear 49$^{c\prime}$, and these shafts are also provided with drums 49$^{b2}$ about which ropes or cables 49$^{b3}$ are wound, the lower ends of these cables being secured to a platform 49$^{b4}$. If a load is placed upon the platform it is obvious that the latter cannot descend unless the tension in the several cords is approximately the same. In other words, the bevel gears 49$^{b\prime}$ must concurrently act with substantially equal forces upon the bevel gear 49$^{c\prime}$ before the shafts 49$^b$ can rotate to pay out the cables.

A further application of the mechanism is disclosed in Figures 64 and 65. A power shaft 50 revolves within the three bearing shoes 50$^b$, which are kept from revolving, though free to move radially relatively to the shaft, by the fixed abutments 50$^{c\prime}$. Each shoe carries a roller 50$^{b\prime}$, which roller presses against the inside cam surface of a ring 50$^c$, the latter supported by the guides 50$^a$, and urged to rotate in a clockwise direction by springs 50$^d$. Pressure of one of the rollers against the corresponding cam face of ring 50$^c$ tends to cause anti-clockwise rotation of this ring, owing to the slope of the cam face, but such rotation is prevented by the binding action of the ring against that one of the guide members 50$^a$, which is adjacent the roller exerting the pressure. Pressure of any two rollers is equally prevented from causing rotation since binding against two guides now occurs. If, however, all three rollers press simultaneously with equal or nearly equal force, binding between ring and guides is relieved, or nearly relieved, so that anti-clockwise rotation of the ring occurs until at least one of the pressures is relieved. If, on the other hand, pressure on all three of the rollers is momentarily relieved, the springs cause a clockwise rotation until one or both of the shoes are pressed against the shaft, when the resulting pressure arrests the motion. Binding, which would cause all three rollers to press against the ring simultaneously is thus automatically relieved, and conversely lost motion is taken up when all three shoes are loose and their rollers do not press against the ring. To avoid vibration in the shaft support as a whole, ring 50$^c$ must be an accurate fit in guides 50$^a$, but this accuracy when once obtained is permanent, so little movement occurring between ring and guides that wear is negligible.

The disclosures of the numerous embodiments of the invention above set forth will doubtless suggest still further forms to those skilled in the art the invention being suitable for incorporation, in one form or another, into many types of machines and implements. In every device constructed in accordance with the principles of the invention there will be a movable member, a "means" with respect to which it may be moved, and a plurality of elements for transmitting force to or from the movable member. The force which brings about movement of the movable member must be a resultant force and to effect movement the resultant must either be a simple force acting within predetermined limits of direction, or a pair of forces tending to produce rotation but which need not necessarily be an exact couple since such a pair of forces not an exact couple can always be resolved into a simple force and an exact couple. It follows that whether or not movement will result under the action of the pair of forces will depend on whether or not the moment of the couple exceeds the friction moment created by the simple force.

In certain of the claims, reference is made to the resultant falling within predetermined limits and it is to be understood that when the resultant is a simple force the predetermined limits relate solely to limits of direction of its line of action and that when the resultant is a pair of forces tending to produce rotation, the limits referred to are to be measured as set forth above.

By "concurrent action of the force transmitting elements" is meant simultaneous action of these elements in a motion producing direction, that is, the elements are simultaneously in compression or in tension. In the double acting forms of the invention one element may be exerting a pull on the movable member and the other a push—both would be active but no motion of the member could result. The actions of the elements here would not be "concurrent."

Having thus described the invention, what is claimed as new and desired to be secured by Letters Patent is:

1. In a mechanical movement, in combination, a plurality of force applying elements arranged to move relatively to each other in different directions under the influence of impressed forces, and means for holding said elements against relative movement except under predetermined conditions, when such movement is permitted, said means including a movable member which all of said elements engage, and a guide for said member which effects a reactive force thereon to hold the same stationary when one of said elements is active, movement of said member by said elements being effected only when at least two of said elements act concurrently to jointly produce a force which unbalances any existing reactive force, whereupon said movable member will move to permit relative movement of all of the active force applying elements.

2. The combination set forth in claim 1 in which movement of said member resulting from concurrent action of said elements is opposed by yielding means which tends to return the said member and the force applying elements to original position after movement.

3. In a mechanical movement, in combination, two elements adapted to be individually moved relatively to each other in opposite directions under the influence of impressed forces, and means for holding said elements against relative movement except under predetermined conditions, when such movement is permitted, said means including a movable member which both of said elements engage, and a support for said member provided with a guide portion for constraining said member to move in a fixed path and which is adapted to effect a reactive force on said member to hold the same stationary except when both of said elements act concurrently to transmit forces to the movable member to jointly produce a force of such magnitude and so directed that any existing reactive force is overcome, whereupon said movable member will move to permit relative movement of both force applying elements.

4. In combination, a support having a portion which comprises a guide, a member associated therewith and constrained by the guide portion of said support to movement along a fixed path, and means for imparting a force to said member within predetermined limits of direction to cause it to move along said fixed path or to impart a force thereto which in direction lies without said limits and which causes said member to grip the guide and to remain immobile relatively to the guide, said means including a plurality of individually operable force applying elements positioned to transmit forces to said member in different directions, a resultant force produced by the concurrent action of at least two of said elements being necessary to effect movement of said member in said fixed path.

5. The combination set forth in claim 4 in which said movable member has a plurality of faces, inclined relatively to its path of movement and to each other, against which the force applying elements respectively bear.

6. The combination set forth in claim 4 in which the support comprises a straight rod and the movable member comprises a wedge slidably mounted on the rod.

7. The combination set forth in claim 4 in which the support comprises a straight rod, the movable member a wedge slidably mounted on the rod, and in which a spring is positioned to oppose movement of the wedge in one direction and to urge it to original position after movement.

8. The combination set forth in claim 4 in which the support comprises a generally cylindrical rod with a flattened side and the movable member comprises a wedge having a cylindrical aperture which receives the said rod.

9. In combination, a supporting rod, a wedge member provided with an aperture through which the rod extends with a close sliding fit, the opposed inclined faces of the wedge making substantially equal angles with the axis of the rod, two individually operable force applying elements bearing respectively upon said inclined wedge surfaces in directions substantially normal to the axis of the rod, the angles of inclination of the inclined wedge-faces relatively to the rod axis and the coefficient of friction between the wedge and rod being such that the said wedge will be moved along the rod when both force applying elements are active and the resultant of the forces which they apply to the wedge lies within predetermined limits, but will frictionally grip and remain stationary on the rod when this resultant lies without such limits.

10. In combination, a movable member, means including a plurality of individually operable force transmitting elements adapted to individually or concurrently transmit forces to said member, and means with respect to which said member is moved by the action of forces concurrently transmitted thereto by at least two of said elements, said means being adapted, under the influence of a force transmitted by one of said elements, to effect a reaction on said member to prevent movement thereof relatively to said means.

11. In combination, a movable member, means including a plurality of individually operable force transmitting elements adapted to individually transmit forces to said member or to concurrently transmit thereto forces which act in different directions, and means with respect to which said member is moved by the action of forces concurrently transmitted thereto by at least two of said elements, said means being adapted, under the influence of a force transmitted by one of said elements, to effect a reaction on said member to prevent movement thereof relatively to said means.

12. In combination, a movable member, means including a plurality of individually operable force transmitting elements adapted to individually or concurrently transmit forces to said member, and means for guiding said member in its movements, the member being movable relatively to the guide by the action of forces concurrently transmitted thereto by at least two of said elements, and said guide being adapted, under the influence of a force transmitted by one of said elements, to effect a reaction on said member to prevent movement thereof relatively to said guide.

13. In combination, a movable member, means including a plurality of individually operable force transmitting elements adapted to individually or concurrently transmit forces to said member, and means for supporting said member and guiding it in its movements, the said member being movable relatively to the supporting and guiding means by the action of forces concurrently transmitted thereto by at least two of said elements, and said supporting and guiding means being adapted, under the influence of a force transmitted by one of said elements, to effect a reaction on said member to prevent movement thereof relatively to said guide.

14. In combination, a movable member, means including a plurality of individually operable force transmitting elements adapted to individually or concurrently transmit forces to said member, means with respect to which said member is moved by the action of forces concurrently transmitted thereto by at least two of said elements, said means being adapted, under the influence of a force transmitted by one of said elements, to effect a reaction on said member to prevent movement thereof relatively to said means, and means for preventing said elements from frictionally retarding the movements of said member.

15. In combination, a movable member having force receiving surfaces, means including a plurality of individually operable force transmitting elements adapted to individually or concurrently transmit forces to the force receiving surfaces of said member in directions normal to such surfaces for all positions of said member, and means with respect to which said member is moved by the action of forces concurrently transmitted thereto by at least two of said elements, said means being adapted, under the influence of a force transmitted by one of said elements, to effect a reaction on said member to prevent movement thereof relatively to said means.

16. In combination, a movable member having force receiving surfaces, means including a plurality of individually operable force transmitting elements adapted to individually or concurrently transmit forces to said surfaces respectively, each such element having a roller thereon which bears against the corresponding force receiving surface and which constitutes the actual means for transmitting a force thereto, and means with respect to which said member is moved by the action of forces concurrently transmitted thereto by at least two of said elements, said means being adapted, under the influence of a force transmitted by one of said elements, to effect a reaction on said member to prevent movement thereof relatively to said means.

17. In combination, a movable member, means including a plurality of individually operable force transmitting elements adapted to individually or concurrently transmit forces to said member, means with respect to which said member is moved by the action of forces concurrently transmitted thereto by at least two of said elements, said means being adapted, under the influence of a force transmitted by one of said elements to effect a reaction on said member to prevent movement thereof relatively to said means, and means for yieldingly opposing movement of said member.

18. In combination, a movable member, means including a plurality of individually operable force transmitting elements adapted to individually or concurrently transmit forces to said member, means with respect to which said member is moved by the action of forces concurrently transmitted thereto by at least two of said elements, a device yieldingly opposing such movement, said means being adapted under the influence of a force transmitted by one of said elements under normal working conditions to effect a reaction on said member, which, in conjunction with the force of the yielding means, operates to prevent movement of said member.

19. A force transmitting mechanism including in combination, two relatively movable members, an element for transmitting a force to one of said members to cause it to bind against the second of said members so that relative movement of said members does not occur and the full force exerted is transmitted to the second member, and a second element which may act concurrently with the first element to transmit a second force to said first member which so opposes the action of the first force that the binding of said first member on the second is prevented or relieved, whereupon relative movement of said members may occur and the transmission of substantial forces to the second member prevented.

In testimony whereof I hereunto affix my signature.

HENRY W. NIEMAN.